Figure 1:
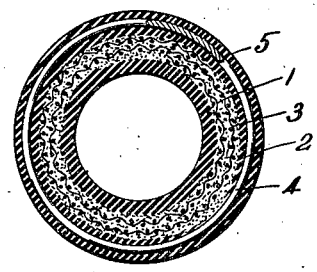

W. T. BONNER.
STEAM HOSE.
APPLICATION FILED APR. 28, 1909.

945,686.

Patented Jan. 4, 1910.

Witnesses
H. C. Robinette
S. V. Caffrey

Inventor
William T. Bonner
By K. P. McElroy
Attorney

UNITED STATES PATENT OFFICE.

WILLIAM T. BONNER, OF TRENTON, NEW JERSEY.

STEAM-HOSE.

945,686. Specification of Letters Patent. Patented Jan. 4, 1910.

Application filed April 28, 1909. Serial No. 492,692.

*To all whom it may concern:*

Be it known that I, WILLIAM T. BONNER, a citizen of the United States, residing at Trenton, in the county of Mercer and State of New Jersey, have invented certain new and useful Improvements in Steam-Hose, of which the following is a specification.

This invention relates to steam hose; and it comprises an element for resisting steam heat and pressure comprising a body of rubber composition reinforced by mineral reinforcers comprising asbestos, such as a steam hose built up of rubber composition and asbestos or chrysotile, with or without reinforcing wire, said rubber forming an integral mass and being free of vegetable fiber; all as more fully hereinafter set forth and as claimed.

Rubber steam hose, steam gaskets and the like are usually made of the ordinary rubber compositions vulcanized in the usual way and containing reinforcing vegetable fiber or textiles, such as canvas, but these steam elements are not long-lived in practice as they become brittle and break up. This I have discovered to be due partly to the presence of the vegetable fiber which, in the presence of the rubber and the vulcanizers it contains, is not as long-lived as the rubber itself. In old steam hose, the canvas reinforcement is "rotten" and breaks away from the rubber. Within the rubber, the canvas does not endure the temperatures and pressures incident to the use of steam hose or steam gaskets as long as the rubber itself. This is perhaps in part due to the excess of sulfur always contained in ordinary vulcanized rubber, acting upon the vegetable fiber. But whatever the cause, the fact exists. For steam goods, it is also desirable to avoid basic oxids or carbonates such as zinc oxid, lead oxid, etc., as fillers. Alumina makes an excellent filler for the present purposes. Some coal tar may be usefully added to the rubber.

For steam hose and steam gaskets, in the present invention, I do away with the vegetable fiber altogether and substitute fibrous mineral matter incorporated in the rubber itself in its lieu. As this mineral matter I employ asbestos or chrysotile. The fiber of asbestos or chrysotile *per se* is not very strong, that is it has not a great deal of tensile strength, and since the fibers have no great locking or felting power, a fabric of asbestos alone is still weaker, not having even the strength of the asbestos fibers *per se.* And it is the usual presumption that in reinforcing goods for this purpose, it is necessary to have fibers or fabric of high tensile strength. This is not altogether correct. The rubber itself has ample tensile strength for most purposes, but in mass it tends to yield and becomes distorted. In the presence of incorporated asbestos fiber, however, this yielding is not possible in the same way as with a mass which is all rubber, the fibers of asbestos forming anchorages for relatively short columns of rubber of high tensile strength. Distortion and yielding are not possible in the same sense as with a body of rubber or rubber composition alone. A hose of rubber composition containing incorporated asbestos or chrysotile fiber or fabric is amply strong for many purposes and is as long-lived as the rubber itself. In the absence of vegetable fiber this life is comparatively long. Wire reinforcement may be employed in connection with the asbestos and in the specific embodiment of my invention at present preferred, is so used. Either the true asbestos or the Canadian chrysotile may be employed.

The hose formed under the present embodiment of my invention is made by using a reinforced asbestos fabric, such as is produced by spinning a coating of asbestos on fine wire, iron or brass, to produce a metal-cored asbestos thread and weaving into a fabric. After the spinning and before the weaving, the coated wire may be given an impregnation or coating of vulcanizable rubber or rubber compound; or the fabric previously produced may be impregnated and saturated with fluent rubber or rubber composition. The asbestos ply or plies assembled with the inner rubber tube should be put on under some tension prior to vulcanization. In spinning the wire with the asbestos fibers, such fibers arch around the wire and in forming a fabric from the coated wire the arching fibers are locked and held between the adjacent wires, thereby securing a full utilization of the strength of such fibers. Since the wires do not come into contact at any point but are spaced away from each other in the fabric by the arching asbestos threads, the fabric as a whole is very flexible; much more flexible than a closely woven fabric of wire alone. The asbestos threads yield, both before and after impregnation with rubber, in such a manner as to make the fabric flexible. This flexibility is very desirable for the present purposes. This produces a still stronger hose the wire reinforcement of the fabric of course giving an almost indefinite amount of strength.

In making the hose, it is preferable that the reinforced fabric be assembled in such manner as to be "on the bias;" that is, with the threads of warp and woof running spirally, as by winding strips of fabric spirally or in any other desired manner. A still further improvement in this hose is given by embodying within its body a spaced spiral wire under tension. For this purpose after the asbestos plies have been applied, wire having a jacketing layer of uncured rubber is wound about it under considerable tension; up to, say 50 pounds. The wire to be used may be prepared by coating it with unvulcanized rubber or rubber composition as if preparatory to insulation. As stated, it should be put on the hose under considerable tension and the several turns should be properly spaced apart and occupying the position intended for them in the finished hose. After the vulcanization, the turns of the wire will be spaced and united by the intervening rubber caused to cohere thereto by the vulcanization.

After vulcanization in the described manner, the rubber of the inner or lining tube, that of the asbestos layers and that of the wire coating is converted into an integral or unitary mass embodying and containing the asbestos fibers and the wire permanently located, spaced and united by such rubber. A short column of rubber such as unites each of the fibers with each other and the fibers with the wire is almost indefinitely strong and in the completed article, proximate pieces or turns of wire and proximate fibers of asbestos are united by such short columns or thin layers of rubber, that a maximum of strength is secured. This is particularly advantageous as regards the asbestos since with each asbestos fiber permeated by rubber and the fibers secured together by rubber a maximum strength is secured, the strength of the asbestos being utilized to the full. The wire of the fabric being under tension when applied while the rubber is left without tension of its own by the vulcanization operation, in the complete article wires under tension are incorporated in rubber under compression. Upon internal pressure within the hose, the rubber incorporated in the fabric is simply relieved of compression while the wire takes the strain. The same is true of the described spiral wire applied under tension. The complete hose may if desired now receive a jacketing layer of spun or woven asbestos if so desired. The intermediate layers of asbestos have very little conductive power for heat and the hose may be conveniently used for steam of quite high temperatures. While an asbestos fabric does not ordinarily have a great degree of strength, yet when used in the described assemblage, its strength is quite great. Each of the ultimate fibers is anchored to every other fiber by thin, strong layers of rubber and the strength of such fiber is utilized, as stated, to a maximum.

A useful method of applying an outer layer of rubber in this hose, with or without the use of the described rubber-spaced wire, is to wind spirally about the hose a strip of unvulcanized rubber under considerable tension to form several plies or layers, each successive ply or layer overlapping the edges of the two next below. After vulcanization, these turns will be converted into an integral body of rubber.

In the accompanying illustration, I have shown more or less diagrammatically, sundry embodiments of this invention.

Figure 2:
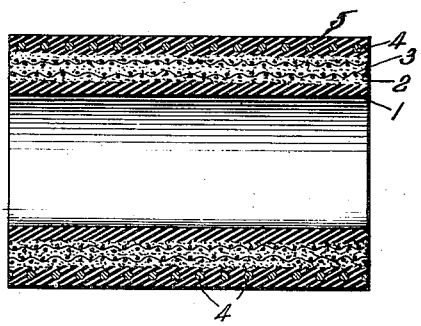
Figure 3:

In this showing:—Figure 1 is a cross section of a steam hose under the present invention carrying reinforcing wire; Fig. 2 is a vertical longitudinal section of the same hose; Fig. 3 is a detail view of a rubber coated wire suitable for use in producing the structure of Figs. 1 and 2; and Fig. 4 is a section of a laminated rubber-impregnated reinforced fabric under the present invention suitable for steam gaskets.

In Figs. 1 and 2, 1 is an inner layer or tube of rubber, 2 is a reinforcing layer of rubber impregnated, wire reinforced asbestos, the reinforcing wires being lettered 3, and 4 is a reinforcing, spirally wound rubber coated wire, the rubber coating being indicated by 5. In Fig. 4, rubber layers 9 and 10 have between them several plies of asbestos 11 reinforced by wire 12.

In producing the article of Figs. 1 and 2, a tube 1 of suitable unvulcanized rubber composition is formed around a suitable mandrel. Suitable fine wire is next covered with a spun or wrapped coating of asbestos fiber, the covered wires are woven or knit into a fabric, this fabric impregnated with rubber or rubber composition and the fabric wrapped around the tube just described in such manner that the fibers are "on the bias", that is, passed spirally around the rubber tube. The asbestos covered fabric may be applied to the tube as several plies, each ply receiving a painting coat of rubber as it is applied. Three or four plies should be used and they should be wrapped around the tube under considerable tension. It is generally preferable to impregnate the plies prior to application. After applying the asbestos the wire of Fig. 3 is wrapped around the structure in a spiral form under considerable tension, up to, say 50 pounds. After this the whole is vulcanized for a relatively long time which converts the rubber of the several layers into one integral mass. The rubber of the interior tube, that of the asbestos reinforcement and that of the outer, wire-carrying layer, is integral, though not so shown in the drawing owing to the exigencies of illustration. After the vulcanization the wire 5 remains under tension, but each turn is effectively and positively spaced from its neighboring turns while united therewith by the rubber.

Figure 4:
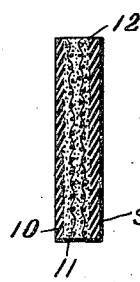

The structure of Fig. 4 is made by producing a sheet of rubber 9, laying upon it 2 or 3 plies of wire reinforced asbestos cloth, impregnated with rubber before or during application, and then forming layer 10 upon the asbestos plies. The whole is then vulcanized as before. As a filler for the rubber composition intended for steam purposes, alumina is to be preferred as it is one of the practically non-reactive oxides, being advantageous for this reason as compared with such reactive bodies as zinc white, lead compounds, antimony compounds, etc. Under the high temperatures and pressures which steam hose must withstand, it is desirable that it contain nothing capable of reacting with rubber. It is desirable that all chemical changes which the rubber is to undergo shall take place during first vulcanization and that thereafter there is nothing in it which will act upon it in use. Using previously coated wire, applied in a spiral under tension and then vulcanized while still under this tension, the turns remain under tension in the complete hose while each turn is effectively isolated from its neighbors. After the vulcanization the wire still remains under tension while the surrounding rubber is placed under some degree of compression thereby. In use the wire is once more placed under tension due to the pressure within the hose while the surrounding rubber is relieved from this compression. Most of the strain upon the hose therefore is taken up by the wire when applied in the described manner.

What I claim is:—

1. In a steam element, a vulcanized rubber body containing a rubber-impregnated layer of wire-cored asbestos threads woven in fabric form, the rubber of said body and of the impregnation forming an integral vulcanized mass.

2. In a steam hose, a tubular rubber body containing an incorporated layer of wire-cored asbestos threads woven in fabric form, said layer being impregnated with rubber and the rubber of the body and of the impregnation forming an integral vulcanized mass.

3. In a steam hose, a tubular body comprising a plurality of rubber layers with an interposed layer of wire-cored asbestos threads in fabric form, said interposed layer being impregnated with rubber and the rubber of the several layers forming an integral vulcanized mass.

4. In a steam element, a vulcanized rubber body containing a rubber-impregnated layer of wire-cored asbestos threads woven in fabric form, the rubber of said body and of the impregnation forming an integral vulcanized mass and the wire cores of the asbestos threads being under tension.

5. In a steam hose, a tubular rubber body containing an incorporated layer of wire-cored asbestos threads woven in fabric form, said layer being impregnated with rubber and the rubber of the body and of the impregnation forming an integral vulcanized mass and the wire cores of the asbestos threads being under tension.

6. In a steam hose, a tubular body comprising a plurality of rubber layers with an interposed layer of wire-cored asbestos threads in fabric form, said interposed layer being impregnated with rubber and the rubber of the several layers forming an integral vulcanized mass and the wire cores of the asbestos threads being under tension.

7. A steam hose comprising an inner layer of rubber, an intermediate layer of rubber-impregnated fabric of wire-cored asbestos and an outer layer of rubber containing a spaced reinforcing spiral wire under tension, the rubber of the several layers being vulcanized into an integral mass and being free of vegetable fiber.

8. A steam hose comprising an inner layer of rubber, an intermediate layer of rubber-impregnated, wire-cored asbestos threads and an outer layer of rubber containing a spaced reinforcing spiral wire under tension, the rubber of the several layers being vulcanized into an integral mass and being free of vegetable fibers.

9. A steam hose comprising a reinforced inner rubber tube containing an incorporated layer of wire-cored asbestos threads and a jacketing layer of a spiral rubber-coated wire under tension, the several turns being spaced and united by the coating rubber thereof, and the rubber of the tube and layer being vulcanized into an integral mass.

10. A hose comprising a tubular body comprising rubber containing an incorporated layer of wire-cored asbestos threads and a jacketing layer of a spirally laid rubber sheathed wire, the rubber of the tubular body and the jacketing layer of rubber sheathed wire being vulcanized to form a unitary mass.

11. A steam hose comprising an inner rubber lining layer, a surrounding layer of rubber impregnated fabric of wire-cored asbestos and a protective outer layer comprising rubber, the rubber of said layers being vulcanized into a unitary mass.

12. A steam hose comprising layers of rubber and of a fabric of wire-cored asbestos threads under tension.

13. A steam hose comprising a rubber body reinforced by a fabric of wire-cored asbestos threads under tension.

14. A steam hose comprising an inner layer of rubber, a layer of fabric of wire-cored asbestos threads and an outer layer of rubber, said layers being vulcanized together, the wire being under tension.

15. A steam hose comprising a tubular assemblage of a plurality of plies of rubber vulcanized to one or more intervening layers of fabric of wire-cored asbestos.

In testimony whereof, I affix my signature in the presence of witnesses.

WILLIAM T. BONNER.

Witnesses:
W. A. Furman,
E. R. Taylor.